(12) United States Patent
Trail et al.

(10) Patent No.: US 10,481,321 B1
(45) Date of Patent: Nov. 19, 2019

(54) CANTED AUGMENTED REALITY DISPLAY FOR IMPROVED ERGONOMICS

(71) Applicant: Facebook Technologies, LLC, Menlo Park, CA (US)

(72) Inventors: Nicholas Daniel Trail, Bothell, WA (US); Sharvil Shailesh Talati, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/123,892

(22) Filed: Sep. 6, 2018

(51) Int. Cl.
*F21V 8/00* (2006.01)

(52) U.S. Cl.
CPC ......... *G02B 6/0088* (2013.01); *G02B 6/0016* (2013.01); *G02B 6/0075* (2013.01)

(58) Field of Classification Search
None
See application file for complete search history.

(56) References Cited

U.S. PATENT DOCUMENTS

| | | | | |
|---|---|---|---|---|
| 1,021,981 | A * | 4/1912 | Galland | B02C 15/04 241/121 |
| 9,304,332 | B2 * | 4/2016 | Fonte | G06F 16/22 |
| 10,067,359 | B1 * | 9/2018 | Ushakov | G02C 7/086 |
| 10,180,579 | B2 * | 1/2019 | Mak | G02B 27/00 |
| 10,197,803 | B2 * | 2/2019 | Badiali | G02B 27/0172 |
| 10,204,456 | B2 * | 2/2019 | Kudirka | G06T 19/006 |
| 10,228,566 | B2 * | 3/2019 | von und zu Liechtenstein | G02B 13/14 |
| 2011/0242481 | A1 * | 10/2011 | Wada | G02O 13/005 351/204 |
| 2016/0327811 | A1 * | 11/2016 | Haddadi | G02C 13/003 |
| 2016/0357032 | A1 * | 12/2016 | Cabeza-Guillen | G02C 13/005 |
| 2017/0045742 | A1 * | 2/2017 | Greenhalgh | G02B 27/0172 |
| 2017/0108697 | A1 | 4/2017 | El-Ghoroury et al. | |
| 2018/0164610 | A1 * | 6/2018 | Liang | G02C 13/005 |
| 2018/0172995 | A1 * | 6/2018 | Lee | G02B 27/0172 |

OTHER PUBLICATIONS

Santini, "All About That Base (Curve)", retrieved from https://www.2020mag.com/article/all-about-that-base-curve and printed on Nov. 6, 2018, 10 pages.
"Prescription Lens Explanation", retrieved from https://www.adseyewear.com/Prescription-Lens-Explanation and printed on Nov. 6, 2018, 10 pages.
"Suncloud Optics US", retrieved from https://www.suncloudoptics.com/techlens Dec. 12, 2017 and printed on Nov. 6, 2018, 6 pages.
"Base Curve Design", retrieved from https://www.pinterest.com/pin/74942781277543368 and printed on Nov. 6, 2018, 4 pages.

(Continued)

*Primary Examiner* — Tina M Wong
(74) *Attorney, Agent, or Firm* — Kilpatrick Townsend & Stockton LLP (57) ABSTRACT

An augmented-reality system has canted waveguides. The waveguides are canted at a wrap angle and/or a tilt angle. Input couplers to the waveguides are designed differently because of the different cant angles. Having canted waveguides allows waveguides to be formed in glasses and/or sunglass that have a base curvature.

20 Claims, 8 Drawing Sheets

(56) References Cited

OTHER PUBLICATIONS

Denney, "Optical Measurements—Boxing System and RX Measurements", retrieved from https://eyenerds.com/blogs/eye-nerds/optical-measurements-boxing-system-and-rx-measurements Dec. 12, 2017 and printed on Nov. 6, 2018, 7 pages.

Santini, "The Real Details of Vertex, Tilt and Wrap", retrieved from https://www.2020mag.com/ce/the-real-details-of-vertex-5E16F and printed on Nov. 6, 2018, 10 pages.

Optician Club, "How to Measure Wrap Angle or ZTILT", retrieved from http://www.opticianclub.com/how-to-measure-wrap-angle-or-ztilt.html Dec. 12, 2017 and printed on Nov. 6, 2018, 2 pages.

\* cited by examiner

CANTED AUGMENTED REALITY DISPLAY FOR IMPROVED ERGONOMICS

CROSS-REFERENCES TO RELATED APPLICATIONS

The following three U.S. patent applications (including this one) are being filed concurrently, and the entire disclosure of the other applications are incorporated by reference into this application for all purposes:
application Ser. No. 16/123,879, filed Sep. 6, 2018, entitled "Waveguide-Based Display for Artificial Reality";
application Ser. No. 16/123,892, filed Sep. 6, 2018, entitled "Canted Augmented Reality Display for Improved Ergonomics"; and
application Ser. No. 16/123,887, filed Sep. 6, 2018, entitled "Waveguide Based Display with Multiple Coupling Elements for Artificial Reality."

BACKGROUND

This disclosure relates generally to near-eye-display systems, and more specifically to waveguide displays. Conventional near-eye displays generally have a display element that generates image light that passes through one or more lenses before reaching a user's eyes. Additionally, near-eye displays in virtual-reality (VR) systems and/or augmented-reality (AR) systems have design criteria to be compact, be light weight, and provide a large eye box and a wide field-of-view (FOV). Traditionally, VR displays are a magnifier optics display, where a computer generates an image and optics are used to magnify the image, and present to the user at a comfortable viewing distance. However, it is challenging to design near-eye displays to simultaneously achieve a small form factor, a large FOV, and/or a large eye box, especially with classical optical architectures.

SUMMARY

The present disclosure relates generally to an artificial-reality system, such as an augmented-reality (AR) system; more specifically, and without limitation, to an ergonomic AR system having a canted frame.

BRIEF DESCRIPTION OF THE DRAWINGS

Illustrative embodiments are described with reference to the following figures.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

This disclosure relates generally augmented-reality and/or virtual-reality systems. More specifically, and without limitation, this disclosure relates to using canted waveguides in augmented-reality and/or virtual-reality systems. Glasses, such as prescription glasses and sunglasses, have a curve to more ergonomically fit a person's face. A curvature of a frame of glasses is sometimes referred to as a base curvature. Sample base curvatures include base 6 and base 8. Curvature can also be measured by a wrap angle. For waveguide-display type systems, it is less complex to fabricate flat waveguides than curved waveguides. Glasses are formed by using canted waveguides to more ergonomically fit a person's face.

An AR display can include a source that generates light. The light from the source is transmitted to an input coupler of a waveguide, through the waveguide to an output coupler, and from the output coupler to a user's eye. For AR glasses, there is a right-eye display and a left-eye display; each display having one or more waveguides. A waveguide can be relatively thick (e.g., 1 mm thick). To make the AR display in a pair of glasses to more closely resemble sunglasses or prescription glasses, the waveguides are canted (e.g., equal to or greater than 2, 4, 5, or 7 degrees and equal to or less than 10, 20, 30, or 45 degrees in an x-z plane and/or in a y-z plane), which makes the AR glasses more ergonomically fit to a human face.

By canting the waveguides, binocular overlap between the left-eye display and the right-eye display can diminish. To increase binocular overlap, the source of an AR display is offset from the waveguide. Yet offsetting the AR source from the waveguide reduces a field of view of the AR display. To increase the field of view, the waveguide and the output coupler for the right-eye display will be designed differently than the waveguide and the output coupler for the left-eye display. For example, the output coupler will have a non-rectangular, asymmetrical field of view with an intent to maximize binocular overlap between the right-eye display and the left-eye display. In some embodiments, the waveguides are canted (e.g., in a y-z plane), since many people have a tendency to look down more often than to look up.

Figure 1:
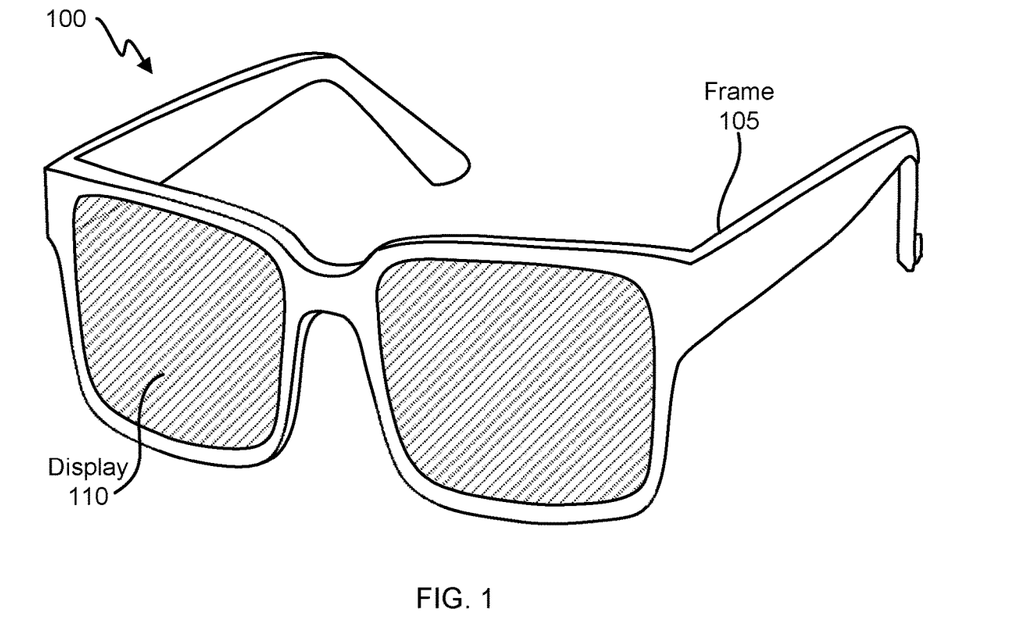
FIG. 1 is a diagram of an embodiment of a near-eye display.

FIG. 1 is a diagram of an embodiment of a near-eye display 100. The near-eye display 100 presents media to a user. Examples of media presented by the near-eye display 100 include one or more images, video, and/or audio. In some embodiments, audio is presented via an external device (e.g., speakers and/or headphones) that receives audio information from the near-eye display 100, a console, or both, and presents audio data based on the audio information. The near-eye display 100 is generally configured to operate as a virtual reality (VR) display. In some embodiments, the near-eye display 100 is modified to operate as an augmented reality (AR) display and/or a mixed reality (MR) display.

The near-eye display 100 includes a frame 105 and a display 110. The frame 105 is coupled to one or more optical elements. The display 110 is configured for the user to see content presented by the near-eye display 100. In some embodiments, the display 110 comprises a waveguide display assembly for directing light from one or more images to an eye of the user.

Figure 2:
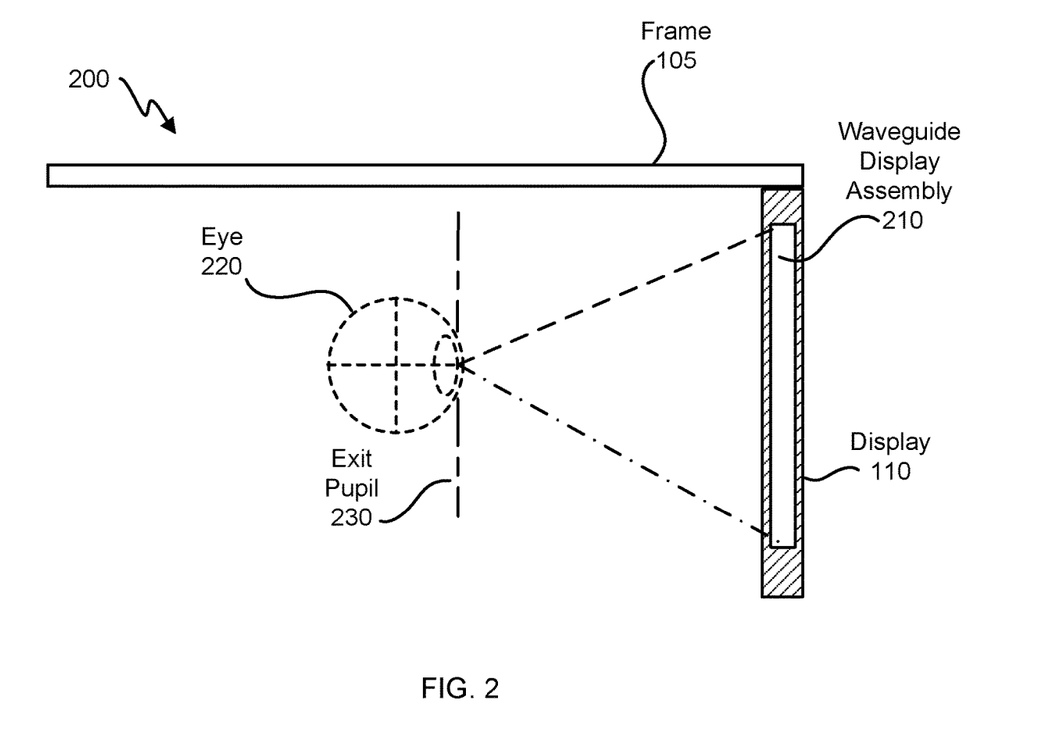
FIG. 2 is an embodiment of a cross section of the near-eye display.

FIG. 2 is an embodiment of a cross section 200 of the near-eye display 100 illustrated in FIG. 1. The display 110 includes at least one waveguide display assembly 210. An exit pupil 230 is a location where the eye 220 is positioned in an eye box region when the user wears the near-eye display 100. For purposes of illustration, FIG. 2 shows the cross section 200 associated with an eye 220 and a waveguide display assembly 210; a second waveguide display assembly is used for a second eye of a user.

The waveguide display assembly 210 is configured to direct image light to an eye box located at the exit pupil 230 and to the eye 220. The waveguide display assembly 210 may be composed of one or more materials (e.g., plastic, glass, etc.) with one or more refractive indices. In some embodiments, the near-eye display 100 includes one or more optical elements between the waveguide display assembly 210 and the eye 220. In some embodiments, the waveguide display assembly 210 includes one or more waveguide displays to generate a singular view to a user.

Figure 3:
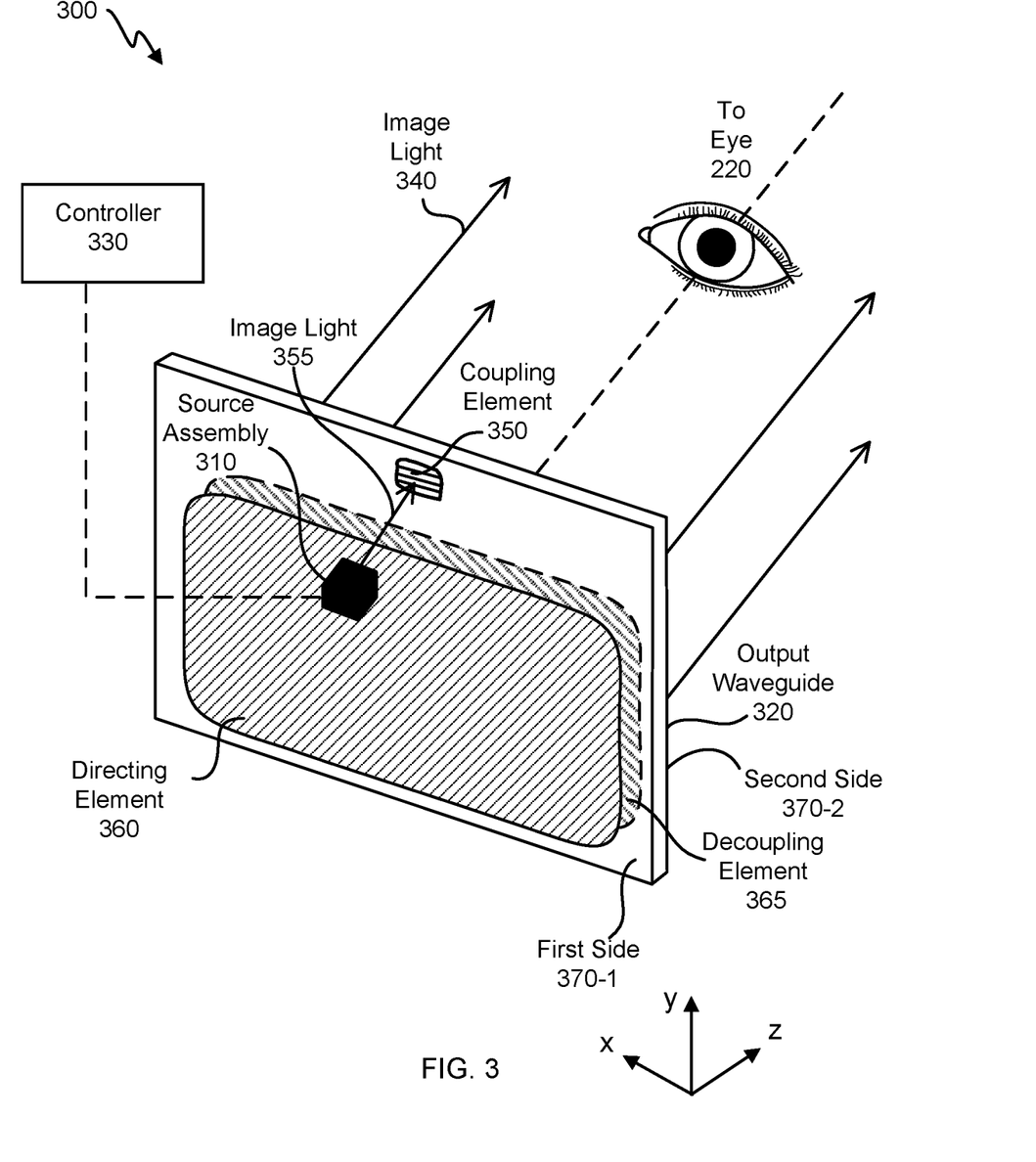
FIG. 3 illustrates an isometric view of an embodiment of a waveguide display.

FIG. 3 illustrates an isometric view of an embodiment of a waveguide display 300. In some embodiments, the waveguide display 300 is a component of the waveguide display assembly 210 of the near-eye display 100. In some embodiments, the waveguide display 300 is part of some other near-eye display or other system that directs image light to a particular location.

The waveguide display 300 includes a source assembly 310, an output waveguide 320, and a controller 330. For purposes of illustration, FIG. 3 shows the waveguide display 300 associated with a single eye 220, but in some embodiments, another waveguide display, whether separate or partially separate from the waveguide display 300, provides image light to another eye of the user.

The source assembly 310 generates image light 355. The source assembly 310 generates and outputs the image light 355 to a coupling element 350 located on a first side 370-1 of the output waveguide 320. The output waveguide 320 is an optical waveguide that outputs expanded image light 340 to an eye 220 of a user. The output waveguide 320 receives the image light 355 at one or more coupling elements 350 located on the first side 370-1 and guides received input image light 355. In some embodiments, the coupling element 350 couples the image light 355 from the source assembly 310 into the output waveguide 320. The coupling element 350 may be, e.g., a diffraction grating, a holographic grating, one or more cascaded reflectors, one or more prismatic surface elements, a metalens, a refractive surface at an angle with or without optical power, and/or an array of holographic reflectors. In some embodiments, the coupling element 350 comprises a volume Bragg grating, a surface relief grating, and/or a meta surface. In some embodiments, the output waveguide 320 is configured to guide red, green, and blue light.

Light from the output waveguide 320 is coupled out of the output waveguide 320 using a decoupling element 365. The output waveguide is used as a pupil expander. Expanded image light 340 decoupled from the output waveguide 320 is transmitted to the eye 220 of a user. In some embodiments, a directing element 360 is used to redirect light in the output waveguide 320 to the decoupling element 365. The directing element 360 is part of, or affixed to, the first side 370-1 of the output waveguide 320. The decoupling element 365 is part of, or affixed to, the second side 370-2 of the output waveguide 320, such that the directing element 360 is opposed to the decoupling element 365. The directing element 360 and/or the decoupling element 365 may be, e.g., a diffraction grating, a holographic grating, one or more cascaded reflectors, one or more prismatic surface elements, a Bragg grating, and/or an array of holographic reflectors. In some embodiments, the directing element 360 can be similar to the decoupling element 365, the directing element 360 can be part of the decoupling element 365, the directing element 360 can be on the second side 370-2, the decoupling element 365 can be on the first side 370-1, the directing element 360 and/or the decoupling element 365 can be between the first side 370-1 and the second side 370-2, and/or the directing element 360 and/or the decoupling element 365 can be absent or part of the directing element 360.

The second side 370-2 represents a plane along an x-dimension and a y-dimension. The output waveguide 320 may be composed of one or more materials that facilitate total internal reflection of the image light 355 with a transparency in wavelength bands of interest. The output waveguide 320 may be composed of plastic, glass, and/or ceramics. The output waveguide 320 has a relatively small form factor. For example, the output waveguide 320 may be approximately 50 millimeters (mm) wide along an x-dimension; 30 mm long along a y-dimension; and 0.3 to 5.0 mm thick along a z-dimension.

In some embodiments, the waveguide display 300 comprises multiple output waveguides 320. For example, waveguide display 300 comprises a stacked waveguide display. The stacked waveguide display is a polychromatic display that can be projected on multiple planes (e.g. multi-planar colored display; a red-green-blue (RGB) display created by stacking output waveguides 320 used for different colors). The stacked waveguide display can comprise three output waveguides 320, one output waveguide 320 for red light, one output waveguide 320 green light, and one output waveguide 320 blue light (sometimes referred to as a waveguide stack). In some embodiments, one waveguide 320 is configured to couple, guide, and out couple red, green, and blue light. In some configurations, two output waveguides 320 are used (e.g., a "red" waveguide and a "blue" waveguide, where "green" is shared between the red waveguide and the blue waveguide). In some configurations, the stacked waveguide display is a display that can be projected on multiple planes (e.g. multi-planar monochromatic display). In some configurations, the waveguide display 300 is a varifocal waveguide display. The varifocal waveguide display is a display that can adjust a focal position of image light emitted from the waveguide display. In some embodiments, the waveguide display assembly 210 may include the stacked waveguide display and the varifocal waveguide display. In some embodiments, a single output waveguide 320 is used for a wide spectrum of light. For example, a Bragg grating is used as the decoupling element 365 and out couples red, green, and blue light from the output waveguide 320.

The controller 330 controls light emitted from the source assembly 310. For example, the controller 330 controls scanning operations of the source assembly 310 and/or timing of light sources turning off and on. The controller 330 can determine scanning instructions for the source assembly 310. The controller 330 can be used to control full-field projector engines. In some embodiments, the output waveguide 320 outputs expanded image light 340. The expanded image light 340 provides an expanded eyebox (relative to a pupil area of the source assembly 310) with a large field of view (FOV) to the user's eye 220. For example, expanded image light 340 is provided to the user such that the waveguide display 300 provides a field of view equal to or greater than 60 degrees and equal to or less than 240 degrees in x and/or y. The output waveguide 320 is configured to provide an eye box with a length equal to or greater than 10 mm and equal to or less than 50 mm in x and/or y. The controller 330 can be used in conjunction with a graphics engine to render image information based on sensors measuring head and/or eye location.

Figure 4:
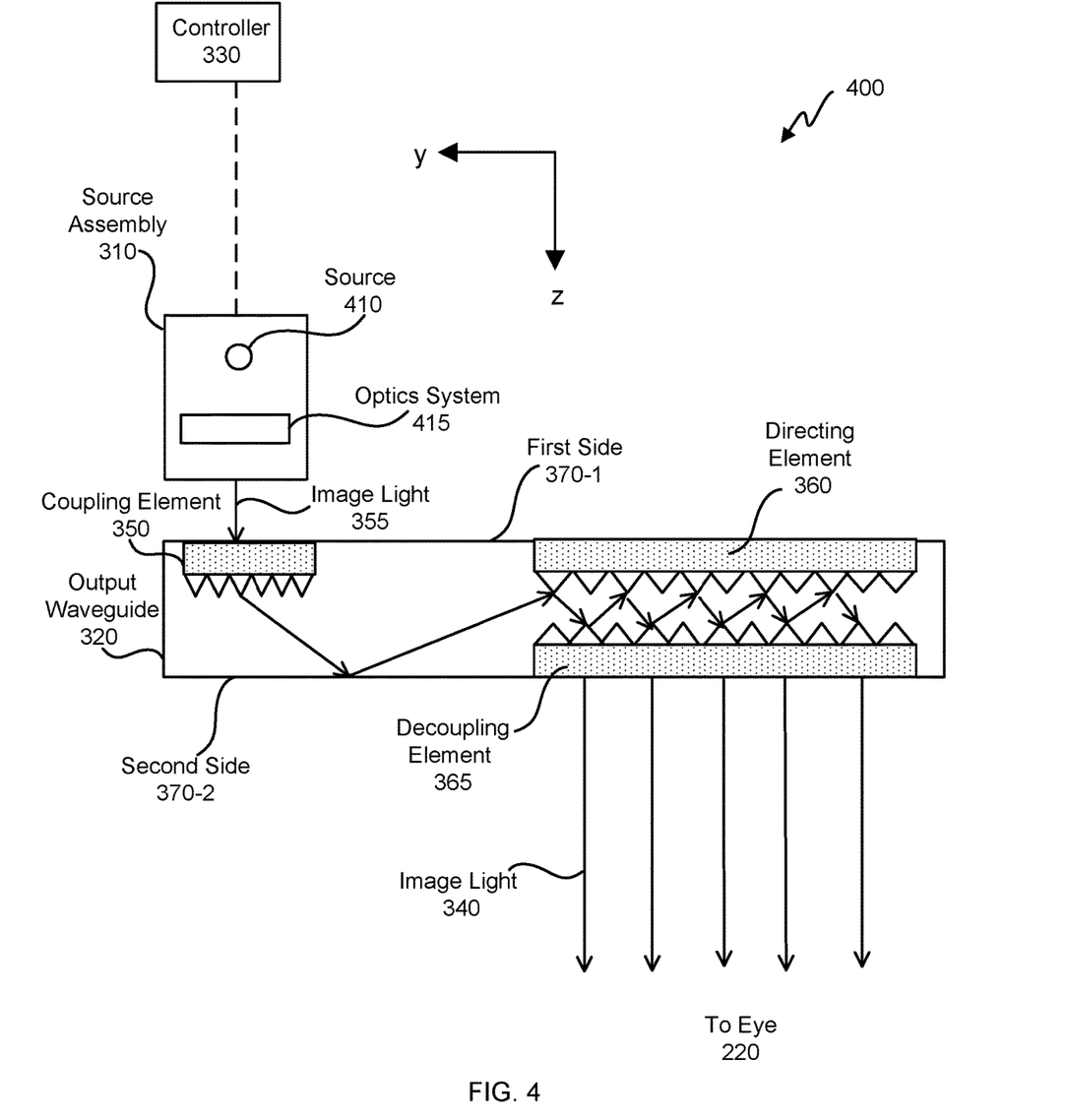
FIG. 4 illustrates a cross section of an embodiment of the waveguide display.

FIG. 4 illustrates an embodiment of a cross section 400 of the waveguide display 300. The cross section 400 includes the source assembly 310 and the output waveguide 320. The source assembly 310 generates image light 355 in accordance with instructions from the controller 330. The source assembly 310 includes a source 410 and an optics system 415. The source 410 is a light source that generates coherent, partially coherent, and/or incoherent light. The source 410 may be a laser diode, a vertical cavity surface emitting laser, a liquid-crystal-on-silicon, a superluminescent diode, and/or an organic or inorganic light emitting diode array (either through spatial or temporal control).

The optics system 415 includes one or more optical components that condition the light from the source 410. Conditioning light from the source 410 may include, e.g., expanding, collimating, and/or adjusting orientation in accordance with instructions from the controller 330. The one or more optical components may include one or more lens, liquid lens, mirror, freeform element, aperture, and/or grating. Light emitted from the optics system 415 (and also the source assembly 310) is sometimes referred to as image light 355.

The output waveguide 320 receives the image light 355. The coupling element 350 couples the image light 355 from the source assembly 310 into the output waveguide 320. In embodiments where the coupling element 350 is diffraction grating, a pitch of the diffraction grating is chosen such that total internal reflection occurs in the output waveguide 320, and the image light 355 propagates internally in the output waveguide 320 (e.g., by total internal reflection), toward the decoupling element 365. The directing element 360 redirects the image light 355 toward the decoupling element 365 for decoupling from the output waveguide 320.

In some embodiments, the directing element 360 and/or the decoupling element 365 are structurally similar. The expanded image light 340 exiting the output waveguide 320 is expanded along one or more dimensions (e.g., may be elongated along x-dimension). In some embodiments, the waveguide display 300 includes a plurality of source assemblies 310 and a plurality of output waveguides 320. Each of the source assemblies 310 emits a monochromatic image light of a specific band of wavelength corresponding to a color (e.g., red, green, or blue). Each of the output waveguides 320 may be stacked together with a distance of separation to output an expanded image light 340 that is multi-colored. In some embodiments, other color schemes are used (e.g., red, green, blue, green-blue). In some configurations, multiple source assemblies (e.g., 2 to 4 RGB source assemblies are used with 3 output waveguides 320, one red output waveguide, one green output waveguide, and one blue output waveguide).

Figure 5:
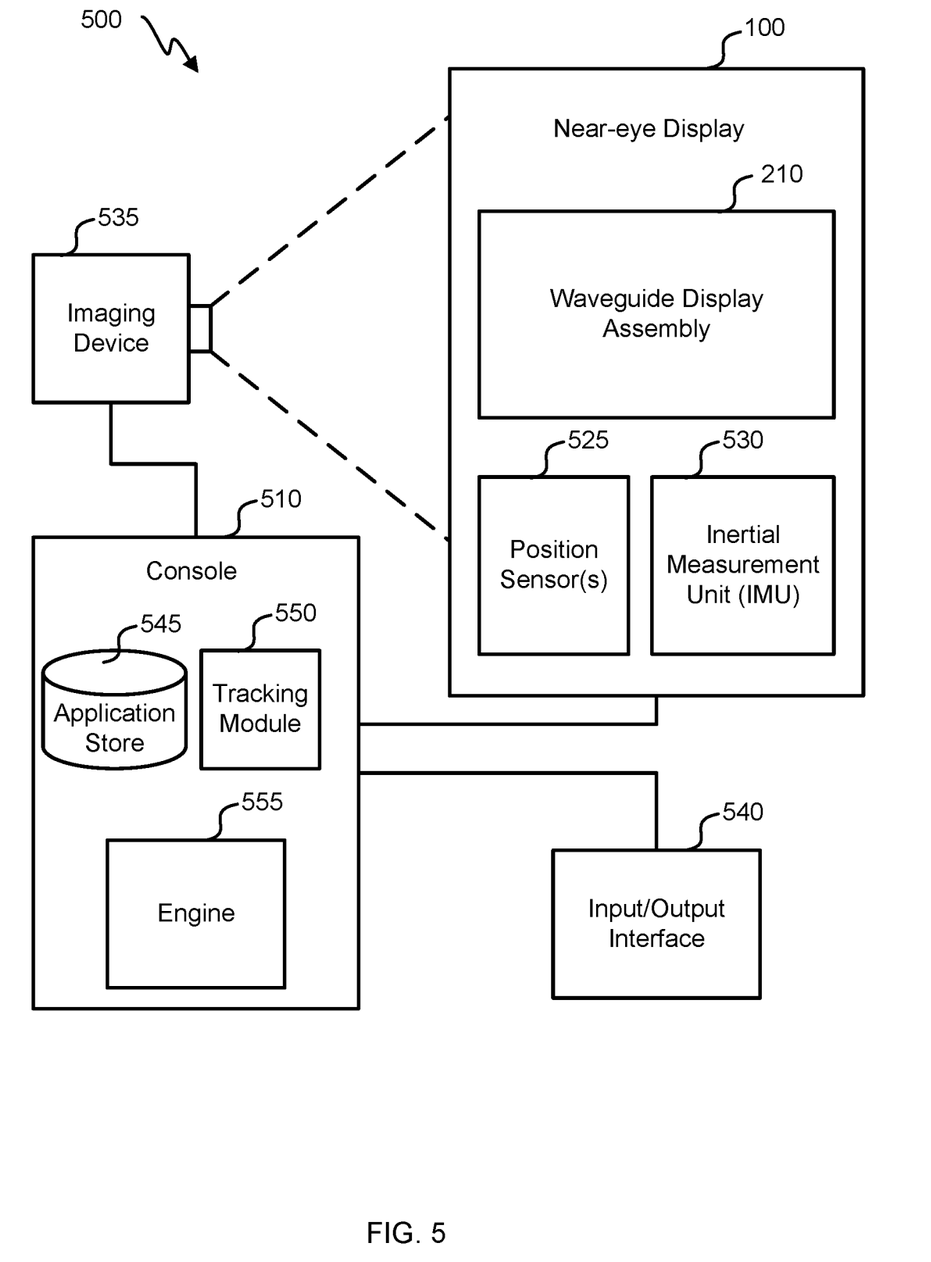
FIG. 5 is a block diagram of an embodiment of a system including the near-eye display.

FIG. 5 is a block diagram of an embodiment of a system 500 including the near-eye display 100. The system 500 comprises the near-eye display 100, an imaging device 535, and an input/output interface 540 that are each coupled to a console 510.

The near-eye display 100 is a display that presents media to a user. Examples of media presented by the near-eye display 100 include one or more images, video, and/or audio. In some embodiments, audio is presented via an external device (e.g., speakers and/or headphones) that receives audio information from the near-eye display 100 and/or the console 510 and presents audio data based on the audio information to a user. In some embodiments, the near-eye display 100 may also act as an AR eyewear glass. In some embodiments, the near-eye display 100 augments views of a physical, real-world environment, with computer-generated elements (e.g., images, video, sound, etc.).

The near-eye display 100 includes a waveguide display assembly 210, one or more position sensors 525, and/or an inertial measurement unit (IMU) 530. The waveguide display assembly 210 includes the source assembly 310, the output waveguide 320, and the controller 330. The IMU 530 is an electronic device that generates fast calibration data indicating an estimated position of the near-eye display 100 relative to an initial position of the near-eye display 100 based on measurement signals received from one or more of the position sensors 525. The imaging device 535 generates slow calibration data in accordance with calibration parameters received from the console 510. The imaging device 535 may include one or more cameras and/or one or more video cameras. The input/output interface 540 is a device that allows a user to send action requests to the console 510. An action request is a request to perform a particular action. For example, an action request may be to start or end an application or to perform a particular action within the application. The console 510 provides media to the near-eye display 100 for presentation to the user in accordance with information received from one or more of: the imaging device 535, the near-eye display 100, and the input/output interface 540. In the example shown in FIG. 5, the console 510 includes an application store 545, a tracking module 550, and an engine 555. The application store 545 stores one or more applications for execution by the console 510. An application is a group of instructions, that when executed by a processor, generates content for presentation to the user. Examples of applications include: gaming applications, conferencing applications, video playback application, or other suitable applications. The tracking module 550 calibrates the system 500 using one or more calibration parameters and may adjust one or more calibration parameters to reduce error in determination of the position of the near-eye display 100. The tracking module 550 tracks movements of the near-eye display 100 using slow calibration information from the imaging device 535. The tracking module 550 also determines positions of a reference point of the near-eye display 100 using position information from the fast calibration information.

The engine 555 executes applications within the system 500 and receives position information, acceleration information, velocity information, and/or predicted future positions of the near-eye display 100 from the tracking module 550. In some embodiments, information received by the engine 555 may be used for producing a signal (e.g., display instructions) to the waveguide display assembly 210 that determines a type of content presented to the user.

Figure 6:
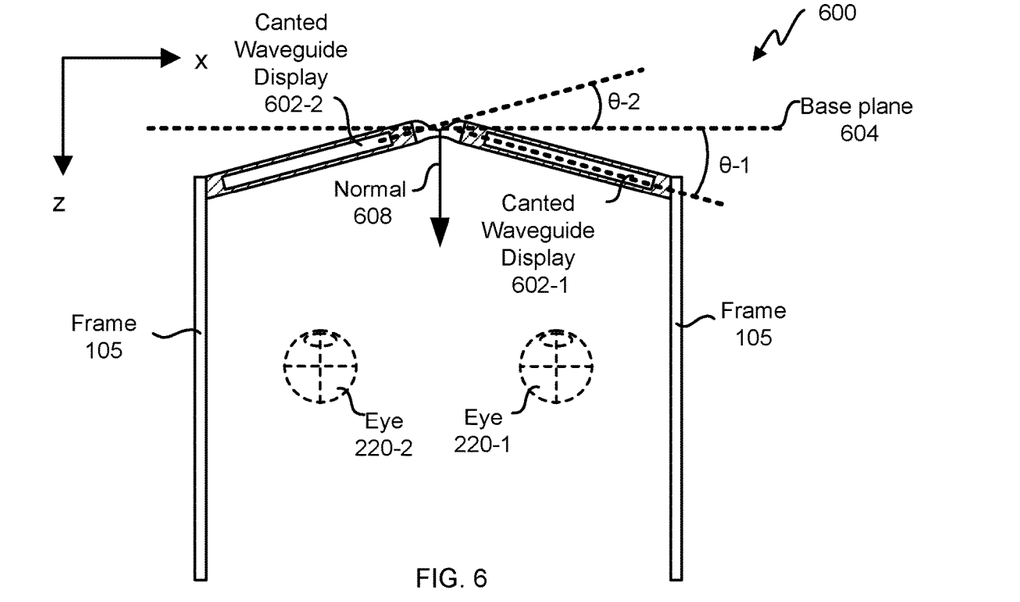
FIG. 6 is a simplified embodiment of an AR system with canted waveguide displays.

FIG. 6 depicts a simplified embodiment of an AR system 600 with canted waveguide displays 602-1 and 602-2. The AR system 600 comprises a frame 105, a first canted waveguide display 602-1, and a second canted waveguide display 602-2. The frame 105 supports the first canted waveguide display 602-1 at a first wrap angle θ-1 in relation to a face of a user of the AR system 600. The frame 105 supports the second canted waveguide display 602-2 at a second wrap angle θ-2 in relation to the face of the user of the AR system 600. The first wrap θ-1 and the second wrap angle θ-2 are measured from a base plane 604. The θ-1 and the second wrap angle θ-2 are non-zero. In some embodiments, the canted waveguide display 602 comprises multiple output waveguides 320.

The base plane 604 is an imaginary, flat, vertical plane with a normal 608 directed (e.g., along a z direction) to a centerline of the face of the user (e.g., the centerline of the face is between eyes 220 of the user) as the user is looking horizontally (e.g., negative z) such that the base plane 604 is equidistant to eyes 220 of the user. In some embodiments, the x and z axes are horizontal axes and the y axis is a vertical axis. The base plane 604 is defined in x and y. The normal 608 points along the z direction. The canted waveguide displays 602 are canted in that they are angled in relation to the base plane 604, wherein the wrap angle θ is measured in a horizontal plane (e.g., in an x-z plane) and the base plane 604 is along the x axis.

The first canted waveguide display 602-1 is skew in relation to the second canted waveguide display 602-2. Skew means neither parallel nor or at right angles. In the illustrated embodiment, for example, the second wrap angle θ-2 is negative the first wrap angle θ-1.

Light from the first canted waveguide display 602-1 is directed to a first eye 220-1 of the user. Light from the second canted waveguide display 602-2 is directed to a second eye 220-2 of the user. In certain embodiments, the first wrap angle θ-1 is equal to or greater than four degrees and equal to or less than 20 degrees. In certain embodiments, the first wrap angle θ-1 is equal to or greater than five degrees and equal to or less than 15 degrees.

Figure 7:
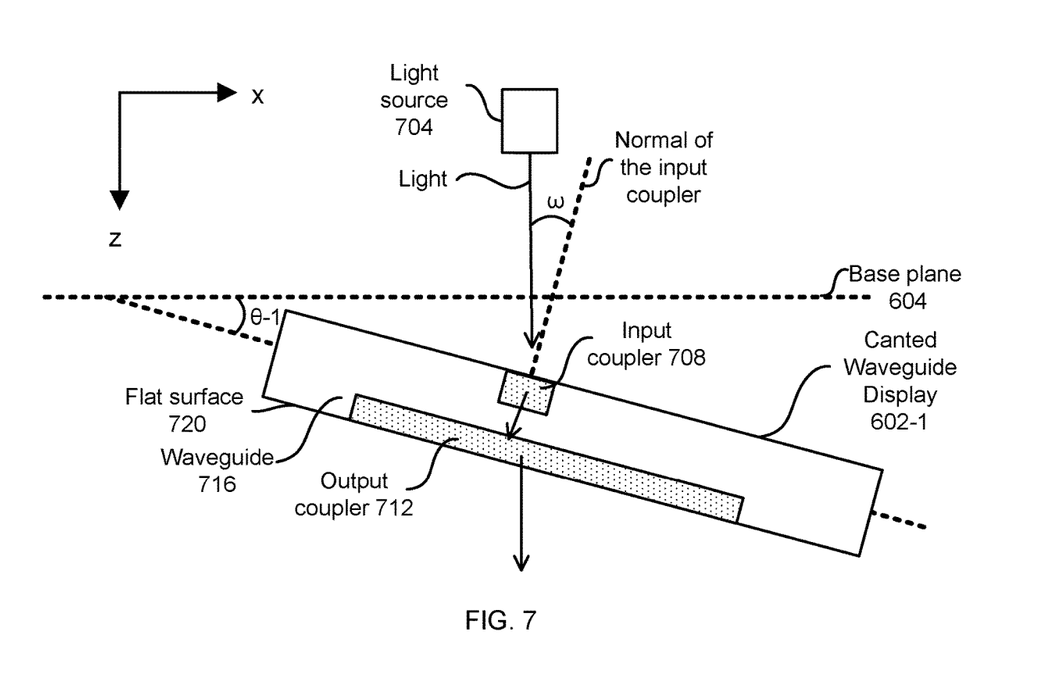
FIG. 7 depicts an embodiment of a canted waveguide display.

FIG. 7 depicts an embodiment of the first canted waveguide display 602-1. A light source 704 generates light (e.g., the light source is a source assembly 310). The light generated by the light source 704 is for an augmented-reality and/or virtual-reality system. The first canted waveguide display 602-1 comprises an input coupler 708 (e.g., coupling element 350, a surface-relief grating, and/or a Bragg grating), to in-couple light from the light source 704; an output coupler 712 (e.g., decoupling element 365 and/or directing element 360), to out-couple light to the user's first eye 220-1; and a waveguide 716 (e.g., output waveguide 320) to guide light from the input coupler 708 to the output coupler 712.

A normal direction of the input coupler 708 is at an offset angle ω with respect to the light source 704 and/or with respect to the base plan. The offset angle ω is measured in the x-z plane, similar plane as the wrap angle θ. In some embodiments, the offset angle ω is equal to the wrap angle θ for a canted waveguide display 602. In some embodiments, the offset angle ω is equal to the wrap angle θ, plus or minus 3, 5, or 10 degrees.

The first canted waveguide display 602-1 is shown. The input coupler 708 is a first input coupler; the output coupler 712 is a first output coupler; and the waveguide 716 is a first waveguide. The second canted waveguide display 602-2 comprises a second input coupler, a second output coupler, and a second waveguide. Light from a light source (e.g., the same source assembly or a different source assembly that generates light to couple into the input coupler 708 of the first canted waveguide display 602-1) is coupled into the second waveguide by the second input coupler; guided by the second waveguide to the second output coupler; and coupled out of the second waveguide by the second output coupler to the second eye 220-2 of the user.

The waveguide 716 has a flat surface 720. In some embodiments, flat is defined by a radius of curvature equal to or greater than 1, 10, and/or 100 meters. The waveguide 716 has a thickness (e.g., measured in a direction normal to the flat surface 720) equal to or between 0.5 and 1.8 mm; or equal to or between 0.2 and 5 mm. In some embodiments, the waveguide 716 is a first waveguide; the first canted waveguide display 602-1 comprises a second waveguide; the first waveguide is configured to guide light of a first wavelength; and the second waveguide is configured to guide light of a second wavelength for the first canted waveguide display 602-1. Other waveguides can be stacked for a waveguide display assembly 210 (e.g., three waveguides for three colors: one for red, one for green, and one for blue).

The offset angle ω of the first canted waveguide display 602-1 is different from the offset angle ω of a second waveguide, wherein the second waveguide is part of the second canted waveguide display 602-2 (e.g., offset angles are negative of each other). Offset angles for the first canted waveguide display 602-1 and the second canted waveguide display 602-2 are different angles because of cant angles. Thus the input coupler 708 of the first canted waveguide display 602-1 is designed differently from the input coupler of the second canted waveguide display 602-2 (e.g., in order to couple light into the second waveguide of the second canted waveguide display 602-2 at different angles compared to coupling light into the first canted waveguide display 602-1). The absolute value of the first wrap angle θ-1 can be equal to the absolute value of the second wrap angle θ-2, i.e., |θ-1|=|θ-2|. In some embodiments, the absolute value of the first wrap angle θ-1 is different than the absolute value of the second wrap angle θ-2, e.g., |θ-1|−|θ-2|=±2, 3, 5, or 10 degrees (such as equal to or greater than |1|, |2|, or |3| and equal to or less than |3|, |5|, or |10| degrees). Similarly, the offset angle ω can be equal to the wrap angle θ, plus or minus 2, 3, 5, or 10 degrees. Angles can be different magnitudes because of non-symmetrical features of the near-eye display 100 (e.g., microphone placement and/or electronics board placement with the frame 105). In an example embodiment, the first wrap angle θ-1 is 10 degrees and the second wrap angle θ-2 is negative 8 degrees, to accommodate a microphone on one arm of the frame 105 to differentiate noise direction. Thus the first wrap angle θ-1 can have a different magnitude than the second wrap angle θ-2.

Figure 8:
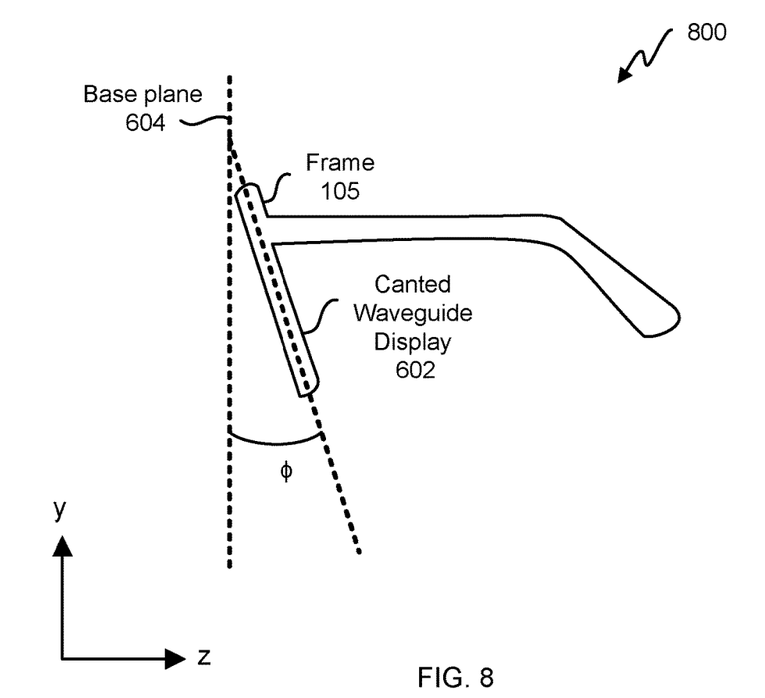
FIG. 8 depicts an embodiment of a canted waveguide display with a tilt angle.

FIG. 8 depicts an embodiment of a canted waveguide display 800 with a tilt angle φ. The frame 105 supports the first canted waveguide display 602-1 and/or the second canted waveguide display 602-2 at the tilt angle φ. The tilt angle φ is measured orthogonally with respect to the wrap angle θ. The tilt angle φ is measured in the y-z plane referenced from the base plane 604, measured from the negative y axis. The tilt angle φ is equal to and greater than 7 degrees and equal to or less than 15 degrees; or equal to and greater than 5 degrees and equal to or less than 20 degrees. The wrap angle θ can be analogized to an azimuth angle and the tilt angle φ can be analogized to an altitude angle. A canted waveguide display 602 can be canted by a wrap angle θ, a tilt angle φ, or both a wrap angle θ and a tilt angle φ. In some embodiments, the tilt angle is zero, non-zero, between 0 and 25 degrees, or between 10 and 20 degrees. In some embodiments, the tilt angle is non-zero and the wrap angle in zero.

Figure 9:
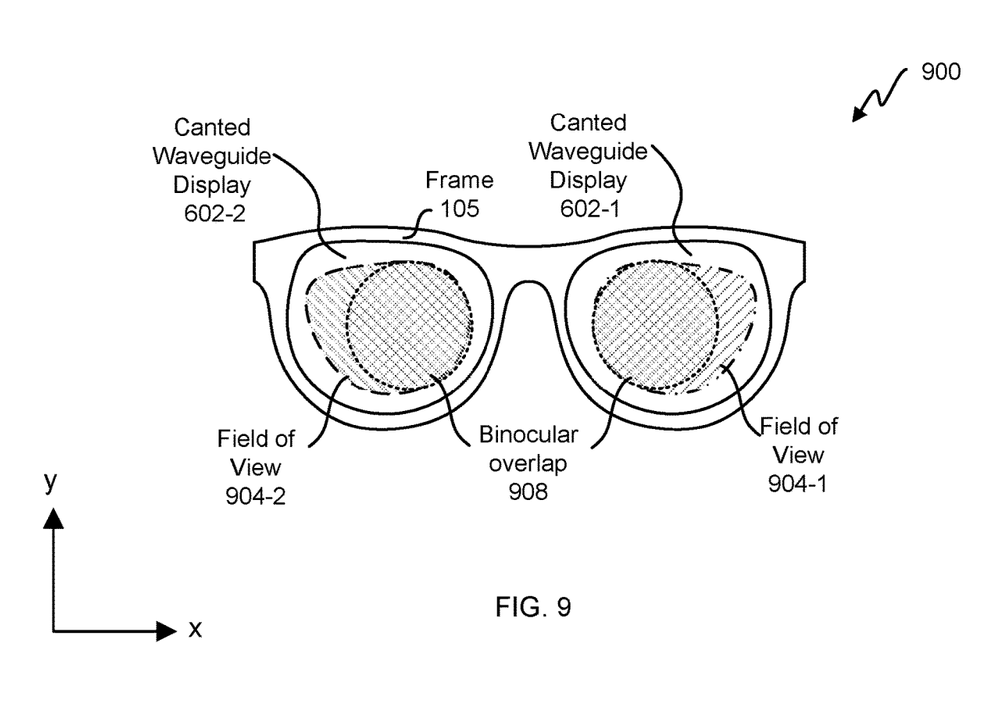
FIG. 9 depicts an embodiment of a canted waveguide display with non-symmetrical fields of view.

FIG. 9 depicts an embodiment of canted waveguide displays 602 with non-symmetrical fields of view 904. The first canted waveguide display 602-1 and the second canted waveguide display 602-2 are held in frame 105. The first canted waveguide display 602-1 has a first field of view 904-1. The second canted waveguide display 602-2 has a second field of view 904-2. Because canted waveguide displays 602 are held at a wrap angle θ and/or a tilt angle φ, there are limited angles from the output couplers 712 that can be directed toward a user's eyes 220. To increase binocular overlap 908 between fields of view 904, fields of view 904 are not limited to rectangular or symmetrical fields of view. Fields of view 904 can be non-rectangular and/or asymmetrical. In some embodiments, the second field of view 904-2 has a different orientation than the first field of view 904-1, even though the first field of view 904-1 may have the same area as the second field of view 904-2. Additionally or alternatively, the second field of view 904-2 mirrors the first field of view 904-1.

Figure 10:
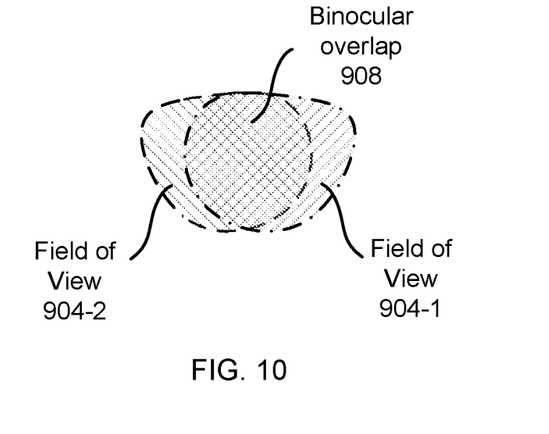
FIG. 10 illustrates binocular overlap between fields of view of canted waveguide displays.

FIG. 10 illustrates binocular overlap 908 between fields of view 904 of canted waveguide displays 602. FIG. 10 depicts fields of view 904 as seen by a user on an AR system. The binocular overlap 908 is a region of display that both eyes 220 of a user can see.

Figure 11:
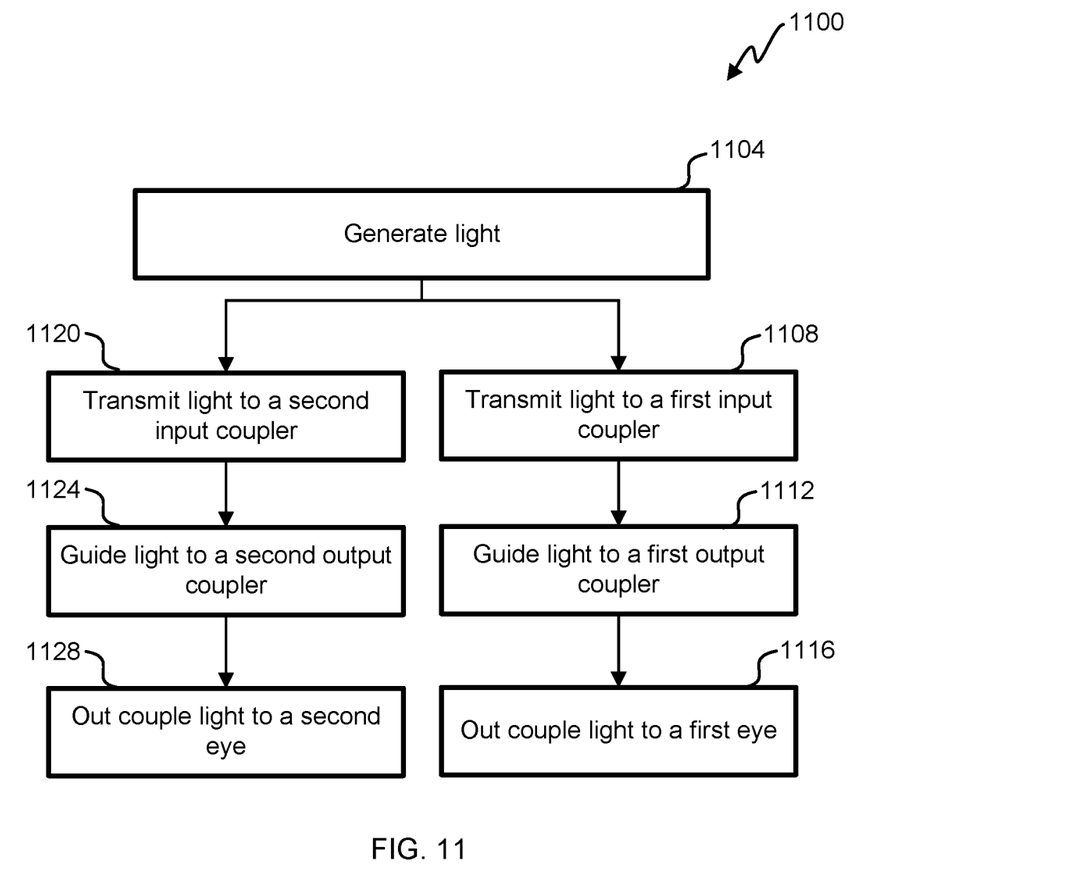
FIG. 11 illustrates an embodiment of a flowchart of a process using canted waveguides in an augmented-reality and/or virtual-reality system.

FIG. 11 illustrates an embodiment of a flowchart of a process 1100. Process 1100 begins in step 1104 with generating light. Light is generated using a light source (e.g., light source 704, which could include one or more sources 410). Light is generated for an augmented-reality and/or virtual reality system. In step 1108, a first portion of light is transmitted to a first input coupler (e.g., input coupler 708 of the first canted waveguide guide display 602-1). In step 1112, the first portion of light is guided in a first waveguide (e.g., waveguide 716 of the first canted waveguide display 602-1) to a first output coupler (e.g., output coupler 712 of the first canted waveguide display 602-1). In step 1116, the first portion of light is out coupled, using the first output coupler, from the first waveguide to the first eye 220-1 of the user, wherein the first output coupler has a first field of view (e.g., first field of view 904-1).

In step 1120, a second portion of light is transmitted to a second input coupler (e.g., an input coupler of the second canted waveguide display 602-2). In step 1124, the second portion of light is guided in a second waveguide (e.g., a waveguide of the second canted waveguide display 602-2) to a second output coupler (e.g., an output coupler of the second canted waveguide display 602-2). In step 1128, the second portion of light is out coupled, using the second output coupler, from the second waveguide to the second eye 220-2 of the user, wherein the second output coupler has a second field of view (e.g., second field of view 904-2). The first waveguide and the second waveguide are held in a frame (e.g., frame 105) and the first waveguide is skew in relation to the second waveguide (e.g., FIG. 6).

In some embodiments, the first portion of light is inputted into the first input coupler at a first angle (e.g., offset angle ω), and the second portion of light is inputted into the second input coupler at a second angle (e.g., −ω), wherein the first angle is different than the second angle. The first input coupler has a different design than the second input coupler because the first waveguide is at a different wrap angle than the second waveguide.

In some embodiments, a waveguide is embedded in freeform lens. The frame and freeform lens can have a base 8 or base 6 curve, while the waveguides (e.g., waveguide 716) are flat. In some embodiments, the freeform lens does not cover a back portion of the waveguide display, leaving an air interface for the back portion of the waveguide display. In some embodiments, the freeform lens wraps around the back portion of the waveguide display but an air gap is disposed between a back portion of the waveguide display and the freeform lens so that light from the waveguide display is diffracted toward an eye of the user (the freeform lens has a refractive index greater than air, which would change diffraction from the waveguide display if there wasn't an air gap). The air gap between the back portion of the waveguide display and the freeform lens can be 100 µm, ±5, 10, or 20%. Further, different lens shapes can be wrapped around the waveguide. A freeform lens could provide correction (e.g., 0.5 diopter) on a first surface, wherein the first surface is between the eye 220 and the waveguide; and the freeform lens could provide correction (e.g., opposite; −0.5 diopter) on a second surface, wherein the waveguide is between the eye 220 and the second surface. In some embodiments, varifocal lenses are used on both sides of a waveguide.

Figure 12:
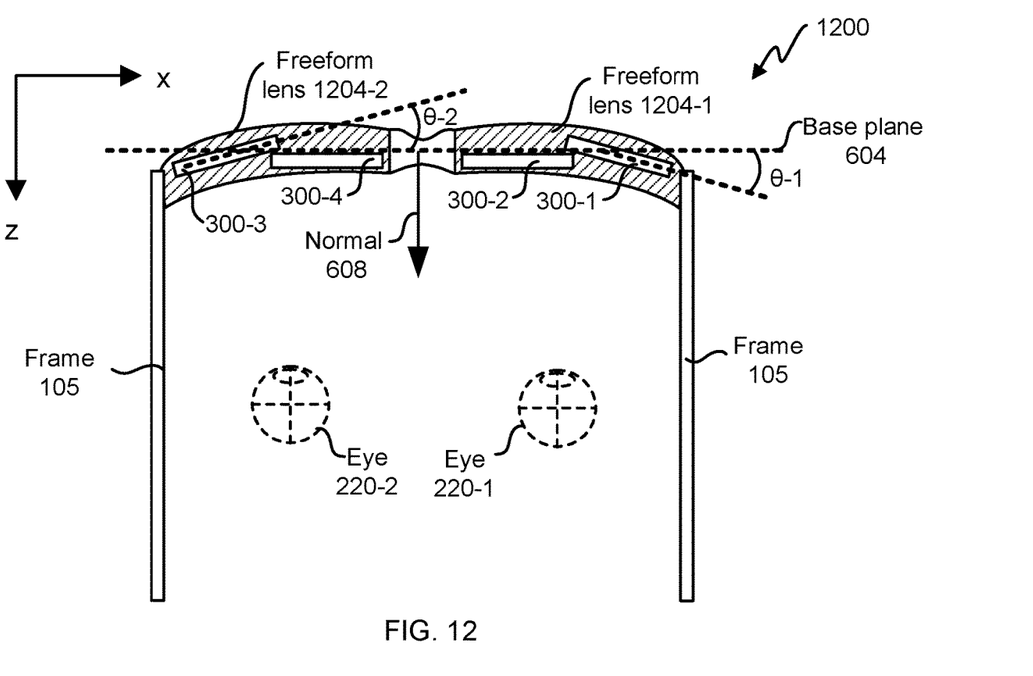
FIG. 12 depicts an embodiment of tiled waveguide displays.

FIG. 12 depicts a simplified embodiment of an AR system 1200 with tiled waveguide displays. The AR system 1200 comprises a first freeform lens 1204-1 and a second freeform lens 1204-2 in a frame 105. The first freeform lens 1204-1 comprises a first waveguide display 300-1 and a second waveguide display 300-2. The second freeform lens 1204-2 comprises a third waveguide display 300-3 and a fourth waveguide display 300-4. The first waveguide display 300-1 in FIG. 12 is similar to the first canted waveguide display 602-1 in FIG. 6; the third waveguide display 300-3 in FIG. 12 is similar to the second canted waveguide display 602-2 in FIG. 6. A base plane 604 is shown. The waveguide displays 300 in the freeform lenses 1204 can be tiled for VR systems as described in the '879 application, entitled "Waveguide-Based Display for Artificial Reality." In some embodiments, the second waveguide display 300-2 and/or the fourth waveguide display 300-4 are also canted (e.g., in θ and/or φ). In some embodiments, a waveguide is cylindrically curved (e.g., to fit in the freeform lens 1204). A curved lens could also be canted (e.g., in θ and/or φ). Thus various combinations of canted, tiled, and/or curved waveguides can be used.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
    a source that generates light for an augmented-reality and/or virtual-reality system;
    a waveguide display, the waveguide display comprising:
        an input coupler, to in-couple light from the source;
        an output coupler, to out-couple light to an eye of a user, wherein the output coupler has a field of view, and the field of view is non-rectangular; and
        a waveguide to guide light from the input coupler to the output coupler; and
    a frame, wherein:
        the frame supports the waveguide display at a wrap angle in relation to a face of the user of the augmented-reality and/or virtual-reality system;
        the wrap angle is measured from a flat, vertical plane with a normal of the flat, vertical plane directed to a centerline of the face of the user; and
        the wrap angle is non-zero.

2. The system of claim 1, wherein the input coupler is a grating.

3. The system of claim 1, wherein the wrap angle is equal to or greater than four degrees and equal to or less than 20 degrees.

4. The system of claim 1, wherein a normal direction of the input coupler is at an offset angle to the flat, vertical plane.

5. The system of claim 1, wherein:
    the frame supports the waveguide display at a tilt angle,
    the tilt angle is measured orthogonally with respect to measurement of the wrap angle, and
    the tilt angle is non-zero.

6. The system of claim 1, wherein the waveguide is flat.

7. The system of claim 1, wherein the waveguide is curved in one dimension.

8. The system of claim 1, wherein:
    the waveguide is a first waveguide;
    the waveguide display comprises a second waveguide;
    the first waveguide is configured to guide light of a first wavelength; and
    the second waveguide is configured to guide light of a second wavelength.

9. A method comprising:
    generating light, using a source, for an augmented-reality and/or virtual-reality system;
    transmitting light generated by the source to a first input coupler of a first waveguide display;
    guiding a first portion of light from the first input coupler to a first output coupler using a first waveguide;
    out coupling the first portion of light to a first eye of a user of the augmented-reality and/or virtual-reality system through the first output coupler, wherein the light out coupled from the first output coupler has a first field of view and the first field of view is non-rectangular;
    transmitting light to a second input coupler of a second waveguide display;
    guiding a second portion of light from the second input coupler to a second output coupler using a second waveguide;
    out coupling the second portion of light to a second eye of the user of the augmented-reality and/or virtual-reality system through the second output coupler, wherein the light out coupled from the second output coupler has a second field of view, and the second field of view is non-rectangular; and wherein:
the first waveguide and the second waveguide are held in a frame; and
the first waveguide is skew in relation to the second waveguide.

10. The method of claim 9, further comprising:
inputting the first portion of light into the first input coupler at a first angle; and
inputting the second portion of light into the second input coupler at a second angle, wherein the first angle is different than the second angle.

11. The method of claim 9, wherein the first input coupler has a different design than the second input coupler because the first waveguide is at a different wrap angle than the second waveguide.

12. The method of claim 9, wherein the first field of view is asymmetrical.

13. The system of claim 1, wherein the field of view is asymmetrical.

14. A system comprising:
a source that generates light for an augmented-reality and/or virtual-reality system;
a waveguide display, the waveguide display comprising:
an input coupler, to in-couple light from the source;
an output coupler, to out-couple light to an eye of a user, wherein the output coupler has a field of view, and the field of view is asymmetrical; and
a waveguide to guide light from the input coupler to the output coupler; and
a frame, wherein:
the frame supports the waveguide display at a wrap angle in relation to a face of the user of the augmented-reality and/or virtual-reality system;
the wrap angle is measured from a flat, vertical plane with a normal of the flat, vertical plane directed to a centerline of the face of the user; and
the wrap angle is non-zero.

15. The system of claim 14, wherein:
the waveguide display is a first waveguide display;
the input coupler is a first input coupler;
the output coupler is a first output coupler;
the waveguide is a first waveguide;
the wrap angle is a first wrap angle;
the eye is a first eye;
the system further comprises:
a second waveguide display, the second waveguide display comprising:
a second input coupler, to in-couple light from the source;
a second output coupler, to out-couple light to a second eye of the user; and
a second waveguide to guide light from the second input coupler to the second output coupler;
the frame holds the second waveguide at a second wrap angle; and
the first wrap angle and the second wrap angle are non-zero.

16. The system of claim 15, wherein an absolute value of the first wrap angle is different from an absolute value of the second wrap angle.

17. The system of claim 15, further comprising a third waveguide display, wherein the third waveguide display is configured to out couple light to the first eye of the user.

18. The system of claim 15, wherein:
the field of view of the first output coupler has is a first field of view;
the second output coupler has a second field of view; and
the second field of view has a different orientation than the first field of view.

19. The system of claim 15, wherein the first input coupler is different from second input coupler to receive input at a different angle than the second input coupler.

20. The system of claim 14, wherein the frame supports the waveguide display at a tilt angle, the tilt angle is measured orthogonally to the wrap angle, and the tilt angle is non-zero.

* * * * *